United States Patent Office 3,190,562
Patented June 22, 1965

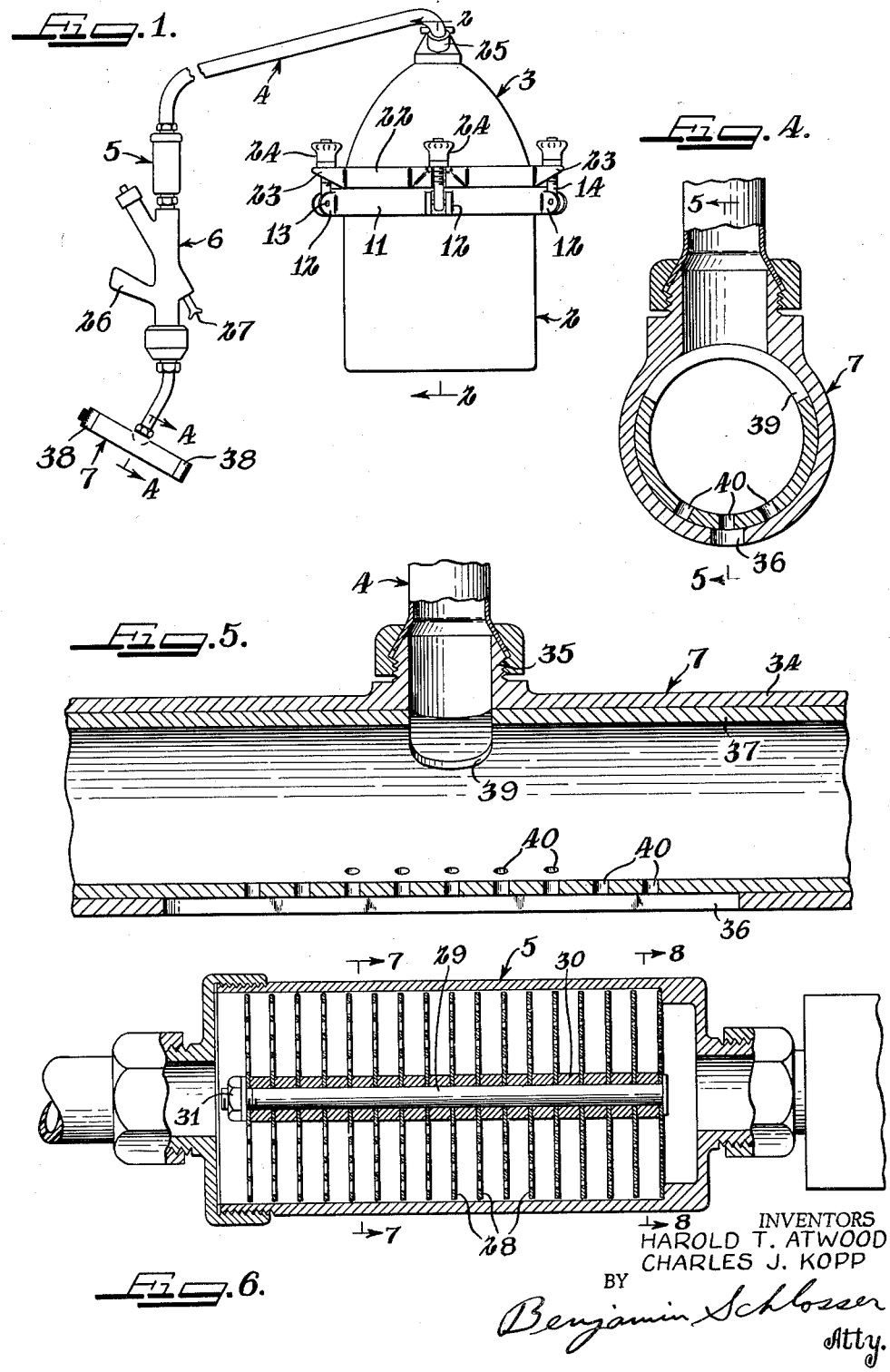

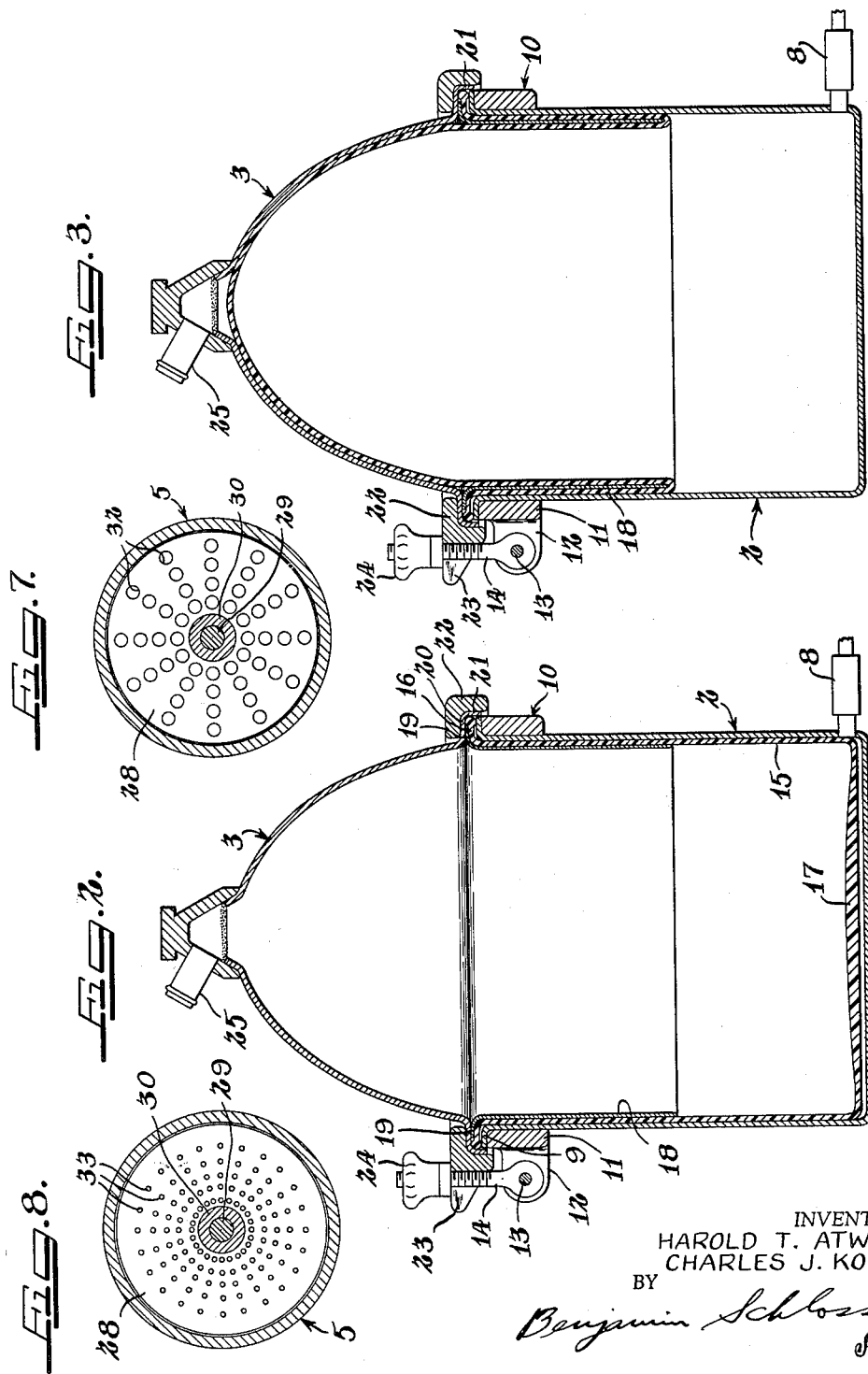

3,190,562
DISPENSING APPARATUS
Harold T. Atwood and Charles J. Kopp, Chicago, Ill., assignors, by mesne assignments, to A & J Designers, Inc., Dolton, Ill., a corporation of Illinois
Filed Nov. 13, 1962, Ser. No. 236,940
5 Claims. (Cl. 239—323)

This invention relates to a dispensing apparatus particularly adapted for dispensing liquids, paste-like materials, and flowable solids from a stretchable plastic bag.

Although the apparatus may be used in many different environments, it is designed especially for use with comestibles and will be described with reference to its use in bakeries, restaurants, and catering establishments, in which cleanliness is of major importance. The plastic bag used for holding the material to be dispensed may be easily cleaned.

Examples of materials dispensed through the apparatus including icing, butter cream, soft ice cream, syrup flavoring, mayonnaise, chopped liver, mashed potatoes, and pie fillings, even those fillings that include pieces of fruit. The dispensing apparatus includes an adjustable dispensing nozzle that may have a single orifice or any preselected number of orifices to provide any predetermined discharge pattern.

The dispensing apparatus also includes a receptacle and a bag of stretchable plastic fitting in the receptacle for holding the material to be dispensed. The receptacle has a fitting on the bottom and a pressure control valve operatively connected to said fitting to regulate the rate of discharge through a hose secured to a fitting at the top of the receptacle.

The stretchable plastic bag may be of any suitable material, but is preferably polyurethane. In addition to being stretchable, the plastic material must have sufficient rigidity so that it can stand upright without outside support. The bag is used as a storage container for the material that is to be dispensed under certain conditions, as, for example, when a portion of the contents of the bag is dispensed and the rest of the contents should be saved for future use. The upper portion of the bag may fit around the outside of a metal sleeve against which the lower portion of the bag is adapted to be inverted. The sleeve may be embedded in the upper portion of the stretchable plastic bag or may be used as a separate member. After the lower portion of the bag is inverted by air pressure, continued application of the air pressure will stretch the lower portion of the plastic bag until it is pressed tightly against the inner surface of the upper portion of the receptacle to squeeze all the contents of the bag through a discharge opening at the top of the receptacle.

The dispensing apparatus is provided with means in the discharge line for whipping cream between the discharge opening at the top of the receptacle and the dispensing nozzle. The means for whipping cream comprises an enlarged tubular section that is removably secured in the discharge line and has a plurality of perforated plates held in longitudinally spaced relationship. The perforated plates are preferably spaced uniformly, but may be spaced in any desired relationship. Each plate covers substantially the entire cross sectional area of the enlarged tubular section. The apertures in the plates may be spaced in any desired uniform pattern, with the apertures in adjacent plates offset from each other, or the apertures in each plate may be spaced at random. In either case the whipping cream must travel a tortuous path from one end of the enlarged tubular section of the discharge line to the other. When the whipping cream is forced through said tortuous path by air pressure it is whipped thoroughly. The apertures in the plates may be of uniform size, but it is preferred to use smaller apertures as the cream approaches the discharge end of the enlarged tubular section. The gradually decreasing sizes of the apertures as the cream passes through successive plates in the enlarged tubular section makes the whipped cream fluffier and increases its volume.

The structure by means of which the above mentioned and other advantages of the invention are attained will be fully described in the following specification, taken in conjunction with the accompanying drawings showing a preferred illustrative embodiment of the invention, in which:

FIG. 1 is an elevational view showing a dispensing apparatus embodying the invention;

FIG. 2 is an enlarged vertical sectional view, taken along the line 2—2 of FIG. 1, showing the stretchable plastic bag in the position occupied by it when it is full of material to be dispensed;

FIG. 3 is a view, similar to FIG. 2, showing the stretchable plastic bag when it is substantially empty and the air pressure is forcing the lower portion of the plastic bag against the inner surface of the cover;

FIG. 4 is an enlarged cross sectional view, taken along the line 4—4 of FIG. 1;

FIG. 5 is a fragmentary longitudinal sectional view, taken along the line 5—5 of FIG. 4;

FIG. 6 is an enlarged view, partly in section and partly in elevation, showing the enlarged tubular section of the discharge line in which the whipping cream is whipped;

FIG. 7 is a cross sectional view, taken along the line 7—7 of FIG. 6; and

FIG. 8 is a cross sectional view, taken along the line 8—8 of FIG. 6.

Referring to the drawings, the dispensing apparatus comprises a metal receptacle 2, a detachable dome-like cover 3, and a discharge line 4. The discharge line has an enlarged tubular section 5 that may be used for whipping cream forced therethrough by air pressure, and an air gun 6 controlling a dispensing nozzle 7.

The receptacle 2 is provided with an inlet fitting 8 adjacent the bottom. The fitting is connected to a source of air under pressure, and a pressure control valve is connected to the line leading from the air supply so that the pressure of the air passing through the inlet fitting into the receptacle can be regulated. The receptacle has an open top surrounded by an annular flange 9. A metal ring 10, secured to receptacle 2 in any suitable manner, extends around the receptacle just below flange 9. The ring 10 may be formed in sections 11 with a lug 12 integral with each end of each section. A bolt 13 connects each pair of adjoining lugs 12. A clamping bolt 14 is pivotally mounted on each bolt 13.

A bag 15 of stretchable plastic, preferably polyurethane, shaped to fit within receptacle 2, has an open top, with an annular flange 16 overlying the top of flange 9 when the bag is positioned in the receptacle. The bag is sufficiently firm to be used as a storage container for the unused contents whenever it is not completely emptied. The bottom of the bag is thicker at the center than at the edges, as indicated at 17, so that when it is completely emptied, the extra thickness at its center makes the bottom too rigid to be blown into the outlet by the air pressure that stretches the lower portion of the bag against the inner surface of the dome-like cover 3.

A metal sleeve 18 fits into the upper portion of bag 15 with an annular flange 19 overlying flange 16. The sleeve 18 may be embedded in the upper portion of bag 15, or may be used as a separate member. Whether it is integral with the bag or is a separate member, it provides a rigid support for the upper portion of the bag so that when air is forced through the inlet 8 only the portion of the bag that extends below the lower edge of the sleeve 18 can be inverted and then stretched.

The cover 3 is provided at its lower edge with an annular flange 20 that terminates in a downwardly extending skirt 21 that covers the flanges 9, 16 and 19. A metal ring 22 fits over flange 20 to hold the cover 3 tightly against the upper edge of receptacle 2. U-shaped lugs 23 extend outwardly from ring 22 in vertical alignment with each clamping bolt 14. Each bolt 14 is long enough so that it projects above the top of lugs 23 when it is swung upwardly about its pivot bolt 13. A nut 24 is then screwed on the top of each bolt 14 to clamp the ring 22 in place. The metal ring 22 is rigidly secured to the dome-like cover 3 so that the receptacle is securely closed when the nuts 24 are tightened.

A fitting 25 at the top of cover 3 provides a discharge opening for the material in bag 15. The fitting 25 may be open to the atmosphere when the bag is being cleaned, but is usually connected to a discharge line 4 hereinafter described. When material is to be dispensed, a bag containing the material is placed in the receptacle and the cover is clamped shut. Air forced in through inlet 8 forces the bottom of bag 15 upwardly, discharging the material through the fitting 25 as the portion of the bag below the lower edge of the metal sleeve 18 is gradually inverted. The continued application of air pressure stretches the lower portion of the bag 15 after it is completely inverted, until it conforms to the interior shape of the cover. At this time substantially all of the material to be dispensed is discharged from the bag. If the bag is to be cleaned, the discharge line is disconnected from the fitting 25 and the air pressure is continued until all the material from the bag 15 is squeezed out through the fitting by the air pressure that forces the stretched portion of the bag tightly against the inner surface of the cover 3. When the discharge line is to be cleaned, it may be connected directly to the line that is normally connected to the inlet fitting and the air will clean out the discharge line.

After all of the contents of the bag have been discharged therefrom, the inlet 8 may be closed, cover 3 may be removed, and the bag may be refilled, for the continuation of the process. Instead of refilling bag 15, the bag may be removed from the receptacle and replaced by another bag containing more of the same material. If a different material is to be dispensed, the discharge line 4 may be disconnected from outlet fitting 25 and connected directly to the source of air formerly connected to inlet 8. The air may then be forced through the discharge line to clean out its contents completely.

In the normal use of the dispensing apparatus, the contents of bag 15 is forced through the discharge line 4 under pressure. Generally such contents may pass through the discharge line 4 to a valve controlled by the gun 6. The gun 6 has a handle 26 and a manually operable plunger 27. When the plunger 27 is depressed, the valve (not shown) is open, and the material may flow without hindrance into the discharge head 7. When plunger 27 is released, it is forced outwardly by a spring (not shown) to close the valve and stop the flow of material to the dispensing nozzle.

When the material being dispensed in whipping cream, an enlarged tubular section 5 is included in the discharge line 4. The enlarged tubular section 5 contains a plurality of transversely extending plates 28 spaced longitudinally of section 5 by a post 29 and a plurality of spacers 30. The plates are clamped in place by a nut 31. The plates 28 are perforated, with the individual apertures in any one plate of uniform size. The size of the apertures may be uniform in all of the plates, but preferably decreases gradually in different plates, with the largest apertures in the plate closest to the entrance of the enlarged tubular section 5 and the smallest apertures in the plate closest to the dispensing nozzle, as indicated at 32, FIGS. 7, and 33, FIG. 8, respectively. Each plate extends from the post 29 to the inner surface of section 5 so that all of the material, such as whipping cream, is forced through the apertures to reach the dispensing nozzle 7. The apertures in adjacent plates are not in alignment, with the result that the whipping cream is thoroughly whipped as it is forced through section 5. The decrease in the size of the apertures as the whipping cream approaches the dispensing nozzle makes the whipped cream fluffier and increase its volume.

The dispensing nozzle 7 comprises a tubular member 34 having a nipple 35 to which discharge line 4 is secured. Tubular member 34 has an elongated opening 36 extending throughout substantially its entire length. An inner tubular member 37 rotatably mounted within tubular member 34 has each end closed by an enlarged closure member 38. The outer surface of end closure members 38 is flush with the outer surface of tubular member 34. The abutting ends of members 34 and 38 may have interfitting notches and projections (not shown) so that the rotational position of tubular member 37 may be easily fixed relative to tubular member 34. A transverse slot 39 in the wall of the tubular member 37 is in registration with the nipple 35 so that the material to be dispensed is forced from the discharge line through the nipple 35 and the slot 39 into the inner tubular member 37. The slot 39 extends through about 90° of the circumference of the inner tubular member so that the inner tubular member may be rotated to a considerable extent without moving the slot 39 out of registration with the fitting 35. The tubular member 37 is provided with three rows of apertures 40 and any row of said apertures may be aligned with the elongated opening 36 without moving the slot 39 out of registration with the nipple 35. In this way the dispensing nozzle may comprise a single aperture 40 or any predetermined number of such apertures, so that a single stream or a plurality of parallel streams of the material being dispensed may be applied to a cake being decorated with icing, for example. It is also possible to remove the dispensing nozzle 7 from the discharge line 4 and replace it with any desired type of dispensing nozzle.

Although we have described a preferred embodiment of our invention in considerable detail, it will be understood that the description thereof is intended to be illustrative, rather than restrictive, as many details of construction may be modified or changed without departing from the spirit or scope of the invention. Accordingly, we do not desire to be restricted to the exact construction described.

We claim:

1. A dispensing device comprising an open top stretchable plastic bag for holding material to be dispensed, an upstanding metal sleeve positioned against the upper edge portion of said bag, a cover, means for holding the lower edge of said cover against the upper edges of said bag and metal sleeve, said cover having a discharge opening spaced above the upper edge of said bag, a discharge line connected at one end to said discharge opening, a dispensing nozzle comprising an outer tubular member and an inner tubular member rotatably mounted in said outer tubular member, and a fitting fixed to said outer tubular member, the other end of said discharge line being secured to said fitting, said outer tubular member having a longitudinal slot therein, said inner tubular member having a transverse slot in registration with said fitting and a plurality of orifices arranged in circumferentially spaced relationship, said transverse slot having sufficient length to maintain its registration with said fitting as said inner tubular member is rotated within said outer tubular member to selectively move one orifice arrangement in registration with said longitudinal slot.

2. A dispensing device comprising an open top stretchable plastic bag for holding whipping cream in liquid form, means for holding the upper portion of said bag against displacement, a cover engaging the upper edge of said bag and extending above it, said cover having a discharge opening spaced above the upper edge of said bag, a discharge line connected at one end to said discharge opening, a dispensing nozzle at the other end of said discharge line, an elongated tubular section in said discharge line intermediate said cover and said dispensing nozzle, means for forcing said liquid whipping cream from said bag through said elongated tubular section, said tubular section having a plurality of longitudinally spaced perforated plates extending across substantially the entire cross sectional area of said tubular section with the perforations of adjacent plates out of alignment, whereby said liquid whipping cream is whipped as it is forced through said tubular section, and means for forcing said whipped cream through said dispensing nozzle.

3. A dispensing device comprising an open top stretchable plastic bag for holding whipping cream in liquid form, means for holding the upper portion of said bag against displacement, a cover engaging the upper edge of said bag and extending above it, said cover having a discharge opening spaced above the upper edge of said bag, a discharge line connected at one end to said discharge opening, a dispensing nozzle at the other end of said discharge line, and an elongated tubular section in said discharge line intermediate said cover and said dispensing nozzle, means for forcing said liquid whipping cream from said bag through said elongated tubular section, said tubular section having a plurality of longitudinally spaced perforated plates extending across substantially the entire cross sectional area of said tubular section with the perforations of adjacent plates out of alignment, the perforations in adjacent plates being of smaller diameter toward the end of said tubular section closest to said nozzle, whereby said liquid whipping cream is whipped as it is forced through said tubular section, and means for forcing said whipped cream through said dispensing nozzle.

4. A dispensing device comprising an open top stretchable plastic bag for holding whipping cream in liquid form, means for holding the upper portion of said bag against displacement, a cover engaging the upper edge of said bag and extending above it, said cover having a discharge opening spaced above the upper edge of said bag, a discharge line connected at one end to said discharge opening, a dispensing nozzle comprising an outer tubular member and an inner tubular member rotatably mounted in said outer tubular member, a fitting fixed to said outer tubular member, the other end of said discharge line being secured to said fitting, and an elongated tubular whipping section in said discharge line intermediate said cover and said nozzle, and means for forcing said whipped cream through said dispensing nozzle.

5. A dispensing device comprising an open top stretchable plastic bag for holding whipping cream in liquid form, means for holding the upper portion of said bag against displacement, a cover engaging the upper edge of said bag and extending above it, said cover having a discharge opening spaced above the upper edge of said bag, a discharge line connected at one end to said discharge opening, a dispensing nozzle comprising an outer tubular member and an inner tubular member rotatably mounted in said outer tubular member, a fitting fixed to said outer tubular member, the other end of said discharge line being secured to said fitting, and an elongated tubular section in said discharge line intermediate said cover and said dispensing nozzle, means for forcing said liquid whipping cream from said bag through said elongated tubular section, said tubular section having a plurality of longitudinally spaced perforated plates extending across substantially the entire cross sectional area of said tubular section with the perforations of adjacent plates out of alignment, whereby said liquid whipping cream is whipped as it is forced through said tubular section, and means for forcing said whipped cream through said dispensing nozzle.

References Cited by the Examiner

UNITED STATES PATENTS

| 2,402,475 | 6/46 | Waterbury et al. | 239—587 |
|---|---|---|---|
| 2,513,455 | 7/50 | Cornelius | 239—323 |
| 2,731,297 | 1/56 | Meyer | 239—323 |
| 2,887,275 | 5/59 | Dixon et al. | 239—462 |
| 3,018,970 | 1/62 | Wittenberg et al. | 239—323 |
| 3,037,710 | 6/62 | Kusznier | 239—462 |

FOREIGN PATENTS

| 658,036 | 1/29 | France. |
|---|---|---|
| 1,090,481 | 10/54 | France. |
| 746,895 | 3/56 | Great Britain. |
| 142,916 | 11/53 | Sweden. |

EVERETT W. KIRBY, *Primary Examiner.*

EDWARD J. MICHAEL, RAPHAEL M. LUPO,
*Examiners.*